United States Patent [19]

Stoll

[11] Patent Number: 4,969,553
[45] Date of Patent: Nov. 13, 1990

[54] BELT SCRAPER WITH GEAR ADJUSTMENT
[75] Inventor: Donald L. Stoll, Huntington, W. Va.
[73] Assignee: Richwood Industries, Inc., Huntington, W. Va.
[21] Appl. No.: 477,365
[22] Filed: Feb. 8, 1990
[51] Int. Cl.5 ............................................ B65G 45/00
[52] U.S. Cl. ................................................. 198/499
[58] Field of Search ............... 198/497, 499; 15/256.5, 15/256.51, 256.6

[56] References Cited

U.S. PATENT DOCUMENTS

| 3,782,534 | 1/1974 | Holleman | 198/499 |
| 4,189,046 | 2/1980 | Ward et al. | 198/499 |
| 4,402,394 | 9/1983 | Stoll | 198/499 |
| 4,533,036 | 8/1985 | Gordon | 198/499 |

FOREIGN PATENT DOCUMENTS

| 2053121 | 2/1981 | United Kingdom | 198/499 |
| 2184084 | 6/1987 | United Kingdom | 198/499 |

Primary Examiner—Joseph E. Valenza
Assistant Examiner—D. Glenn Dayoan
Attorney, Agent, or Firm—Biebel, French and Nauman

[57] ABSTRACT

A belt scraper which has first and second pairs of scraper support arms as well as first and second actuator arms for each of the support arms, and includes a gear adjustment by which the position of the belt scrapers may be adjusted with respect to the belt and with respect to the actuator arms, from a convenient position alongside of the belt.

4 Claims, 5 Drawing Sheets

BELT SCRAPER WITH GEAR ADJUSTMENT

BACKGROUND OF THE INVENTION

This invention relates to the art of belt scrapers and more particularly to an improvement in the dual type belt scraper as disclosed in my U.S. Pat. No. 4,402,394 issued Sept. 6, 1983.

In the above patent, a pair of longitudinally spaced belt scraper blades are mounted on arms for rotation about a common axis toward and away from the outer surface of a conveyor belt. The scraper blades are independently movable about the common axis and are biased into engagement with the belt by the operation of pairs of actuator arms, one pair at either end of the scraper assembly. The remote ends of the actuator arms are biased by an actuator, in the form of an air-over-hydraulic pressure cylinder, typically in the form of an air-loaded shock absorber. The air delivered to the actuator may be suitably adjusted to provide the desired biasing force for urging the respective blades against the belt surface.

When setting up a new belt scraper in accordance with my patent, or when changing the blades on an existing set up, the blades on the blade support arms must first be brought into contact with the belt while a connecting clutch is loosened. The final tightening of the bolts re-engaging the clutch must be accomplished while holding the blade arms in an adjusted position. This procedure can be somewhat awkward and time-consuming to accomplish in that it may require a person getting under the belt and holding the belts in position while a second person tightens the correcting clutch. A need therefore exists for a set-up and blade adjustment mechanism in a two-blade scraper by means of which the initial blade adjustment may be accomplished readily and easily by a single operator from a location alongside the belt scraper.

SUMMARY OF THE INVENTION

The invention is directed to an improved belt scraper apparatus in which first and second pairs of primary or scraper blade support arms carry or support transversely oriented belt scraper blades, and particularly including an improved mechanism by which the angular position of the primary support arms may be adjusted in relation to each other and in relation to the respective actuator arms. This is accomplished by providing self-contained reduction gear drives by which the relative position of one of the actuator arms, at each end of the belt scraper, may be angularly repositioned with respect to its associated shaft and primary arm, simply by rotating a small pinion gear which is in mesh with a larger bull gear. The gears are mounted in a housing forming part of the actuator arm support. The bull gear, in the housing, is in driving relation to the shaft which carries the associated primary arm. A stub shaft extends from the pinion gear external to the housing, providing for the attachment of a wrench or crank to make the required adjustment.

The adjustment of the position of one of the belt scraper support arms in relation to its actuator arm permits the operator to provide the desired position of each of the two belt scrapers, since these scrapers are urged by a common air cylinder or hydraulic actuator at the ends of their respective actuator arms. Also, changes in the relative angular position of the blade support arms and actuator arms provide initial adjustment or blade at either side of the belt, can readily be accomplished by one person, while viewing the position of the scrapers. Once adjusted, the position may be locked by clamping the gears in adjusted position.

It is accordingly an object of the invention to provide an improved belt scraper apparatus including gear means by which one of a pair of belt scraper blades may be adjusted in position with respect to the other of a pair of belt scraper blades, from a position adjacent to the side of the belt, at initial set-up or following blade replacement. The adjustment permits the positioning of the tensioning or actuating arms in relation to the air cylinder actuator and in relation to the running surface of the belt. Thereafter, the air cylinder actuator which joins the arms provides for movement of the belt scraper blades through extension or contraction movement of the actuator as transmitted to the scraper arms, in accordance with the teachings of my patent identified above.

It is accordingly an important object of this invention to provide a conveyor belt scraper in which the relative position of a scraper blade in relation to its actuator arm is adjustable from a position alongside of the belt.

A further object of the invention is the provision of a conveyor belt scraper, of the kind identified above, in which the relative position of one of the tension or actuator arms is adjusted with respect to the associated scraper support arms through a reduction gearing arrangement integrally carried on each side of the support mechanism.

These and other objects and advantages of the invention will be apparent from the following description, the accompanying drawings and the appended claims.

BRIEF DESCRIPTION OF ACCOMPANYING DRAWINGS

DESCRIPTION OF PREFERRED EMBODIMENT

Figure 1:
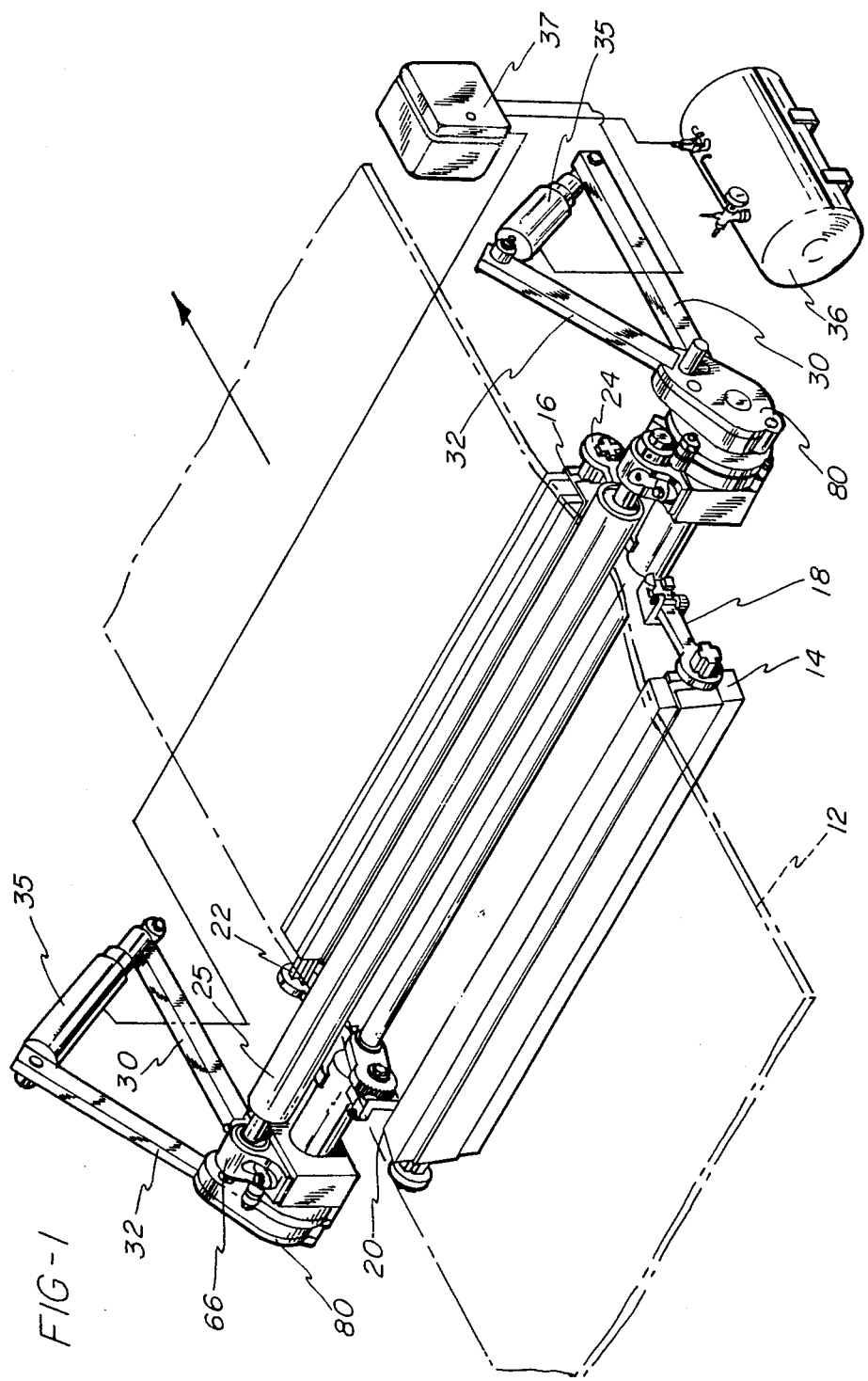
FIG. 1 is a perspective view of a belt scraper in accordance with this invention.

Referring to the drawings, which illustrate a preferred embodiment of the invention, a belt scraper is shown in FIG. 1 as including a pair of scraper blades for engagement with the outside surface of a belt 12. The spaced apart scraper includes a first or primary belt scraper blade 14 and a second belt scraper blade 16. The blade 14 is mounted on primary support arms 18 and 20, while the blade 16 is carried on arms 22 and 24. The belt scraper of this invention may be positioned to engage the outside surface of the belt 12 at the head roll of the conveyor, or may incorporate and include its own backing roll 25 which supports the belt 12 for movement across the respective belt blades 14 and 16.

It will be understood that the scraper blades 14 and 16, and the associated support arms for these blades, are mounted for rotation about a common transverse axis, and this mounting arrangement permits the blade 14 to move independently of the blade 16. The mechanism which supports the respective pairs of support arms 18, 20 and 22, 24 is essentially duplicated at each side of the belt scraper and is described in further detail in connection with FIGS. 2-4.

Separate actuator or tension arms are associated with each of the blades 14 and 16, and for the purpose of this invention, one pair of actuator arms 30 are connected to move the blade 14, while the adjacent pair of arms 32 are each connected to move the blade 16. The remote ends of the pairs of arms 30 and 32 are each connected to an air-over-hydraulic automotive type actuator 35 as described in my U.S. Pat. No. 4,402,394. The belt scraper is symmetrical in that actuator arms 30 and 32, and the associated adjustment mechanisms are positioned at each lateral side of the belt 12, and each pair of the arms 30 and 32 is biased or controlled by an actuator 35. Air under controlled pressure is applied to each of the actuators from a supply tank 36 and through a regulator 37, as illustrated in FIG. 1.

A characteristic of the belt scraper in accordance with this invention is that the primary scraper blade 14 and the secondary scraper blade 16 are mounted for rotation on concentric common axes. Since the rotational mounting and support structure for the blade arms and for the tension or actuator arms are essentially identical, at either side of the belt, the sectional illustration of the mounting of FIGS. 3 and 4, are typical for both of the mounting arrangements at either side of the belt.

Figure 2:
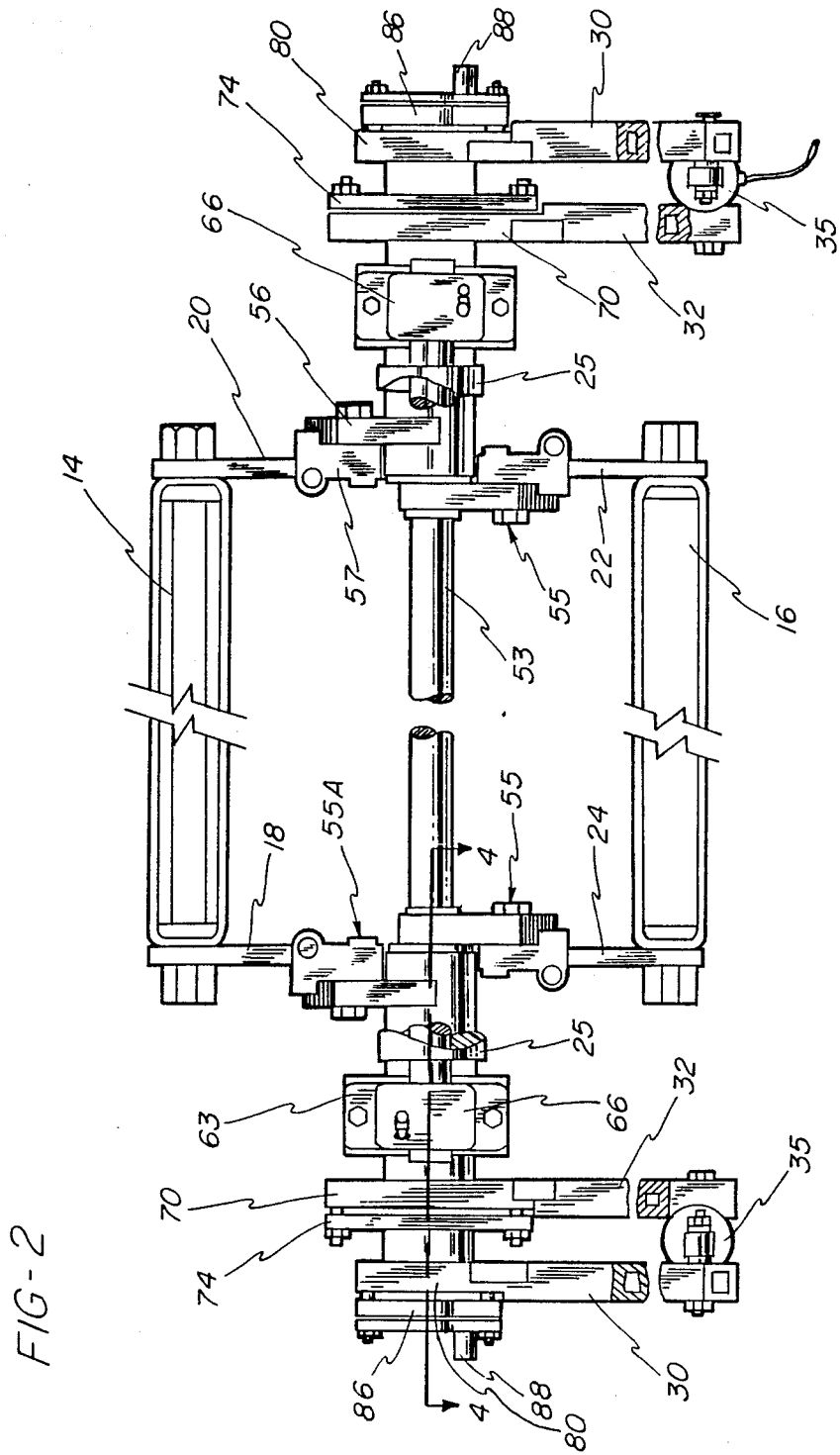
FIG. 2 is a partially broken away plan view of the scraper of FIG. 1.
Figure 3:
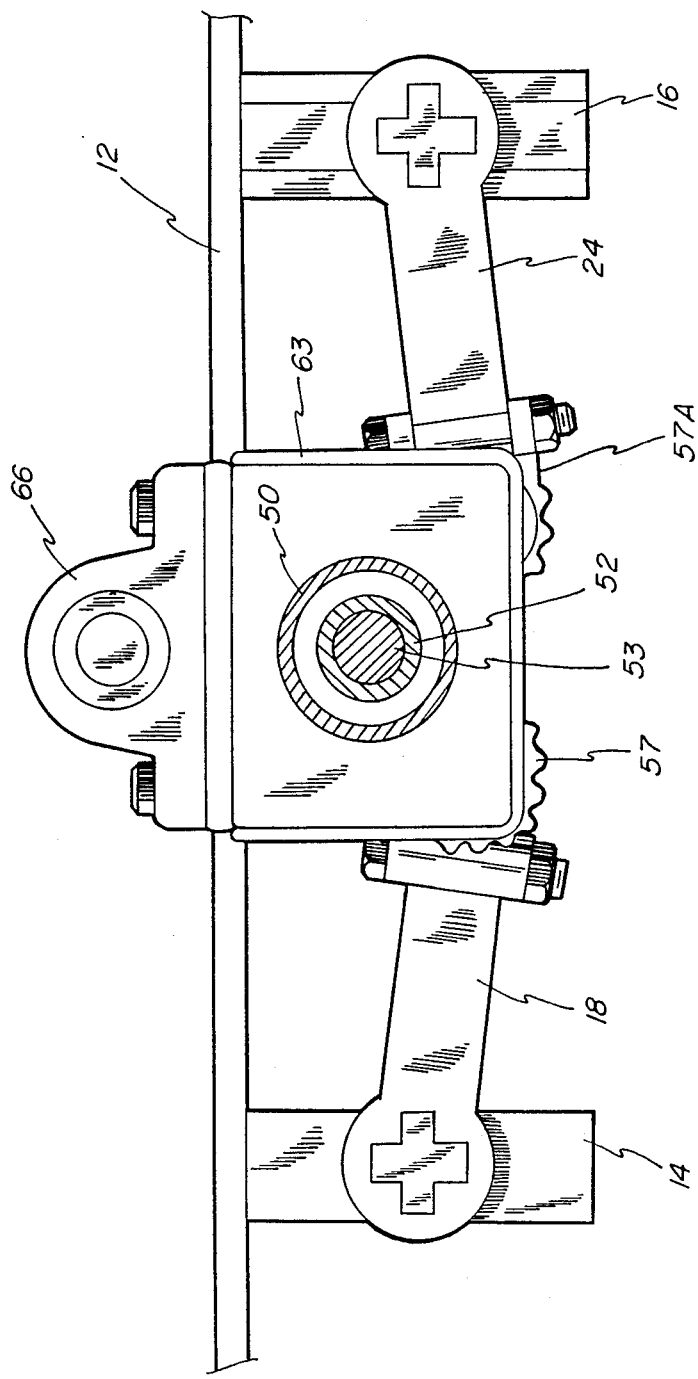
FIG. 3 is a sectional view taken generally along the line 3—3 of FIG. 4.
Figure 4:
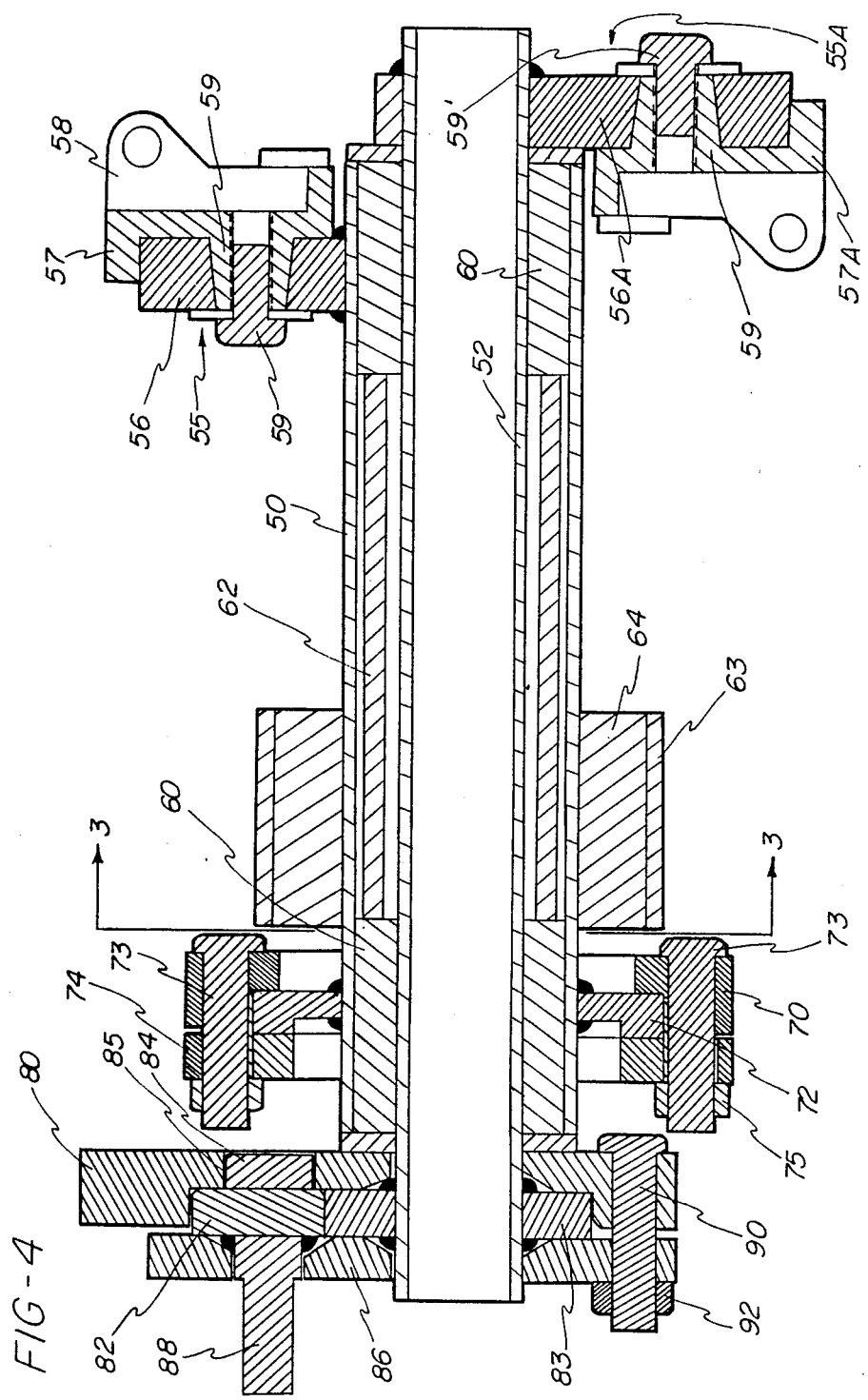
FIG. 4 is an enlarged section taken generally along the line 4—4 of FIG. 2.

With particular reference to FIGS. 3 and 4, an outer tubular shaft 50 supports one of the pair of blade arms and is mounted in concentric relation to an inner tubular shaft 52 which supports the other of the pair of blade arms. As shown in FIGS. 2 and 3, but not shown in FIG. 4 for the sake of simplicity, a solid support rod 53 may be extended through the inside of the shaft 52, for the full transverse width of the scraper, for supporting the scraper in its position, in relation to the belt 12.

The blade supporting arms are not shown in FIG. 4, but the adjustable arm-attaching knuckle joints are shown, associated with each of the shafts 50 and 52. A first knuckle joint 55 includes an arm portion 56 welded to the outer surface of the shaft 50 and carrying a rotatably lockable blade arm support member 57. The blade arm support member 57 has a recessed portion 58 for receiving the inner end of one of the blade-supporting arms, such as the arm 18. Also, as shown in FIG. 4, the arm support member 57 and arm portion 56 of the knuckle joint 55 have tapered interfitting parts in the form of a conical support portion 59 on the blade arm support member 57 received within a suitable tapered opening formed in the arm 56, and retained in an adjusted angular position by a stud bolt. The relatively interfitting parts may be provided with interfitting serrations or knuckles for defining and maintaining an adjusted position of the respective blade support arms with respect to their associated support tubes or shafts 50, 52.

An essentially duplicate arrangement of parts is associated with the inner tubular shaft 52, including a knuckle joint arm portion 55a welded to an extended end of the shaft 52, and a blade support member 57a, identical to the member 57 angularly adjustably mounted on the knuckle joint arm portion 56a.

The respective concentric shafts 50 and 52 are free to rotate one relative to the other on a pair of spaced polymeric bushings 60. The spacing between the bushings is maintained by a tubular spacer sleeve 62 extending between the bushings 60. A block support 63 is mounted in concentric relation to the outer shaft 60 on a resilient bushing 64, and forms a support for the pillow block 66 (FIG. 4) for the backing roll 25.

As previously described, each of the tension arms is adjustably carried on one of the concentric shafts 50 or 52. One of these adjusting arrangements is the continuous geared adjustment, to be described later in the specification, and which provides the versatility in the initial set-up and adjustment of the belt scraper, such as after blade replacement. Such continuous adjustment is only required for one of the two tension arms 30, 32, on either side of the machine, and the other tension arm may be mounted to its associated shaft through a serrated clutch type of adjustment. Such adjustment is commonly made only at one time, such as during initial set-up to define a desired relationship between the position of the tension or actuator arm and the blade. Thereafter, the final adjustments may be made through the continuous gear adjustment of this invention. Accordingly, the means for adjusting the relative position of one of the actuator or tension arms, such as the arm 32, to the associated shaft 50 includes a tension arm holder 70. The holder 70 is mounted on a serrated ring 72, by stud bolts 73 and a clamping ring 74. When the nuts 75 on the stud bolts 73 are loosened, the tension arm holder 70 may be rotated with respect to the fixed position of the ring 72, and reclamped by the tightening of the nuts 75.

The invention further includes means for the continuous adjustment of the other of the actuator arms 30 with respect to its associated shaft 52 from positions alongside of the belt 12. In this manner the associated blade arms 18, 20 and the blade 14 may be moved with respect to the blade 16, to bring the parts into a proper scraper relation as shown, for example, in the illustration of FIG. 1.

Figure 5:
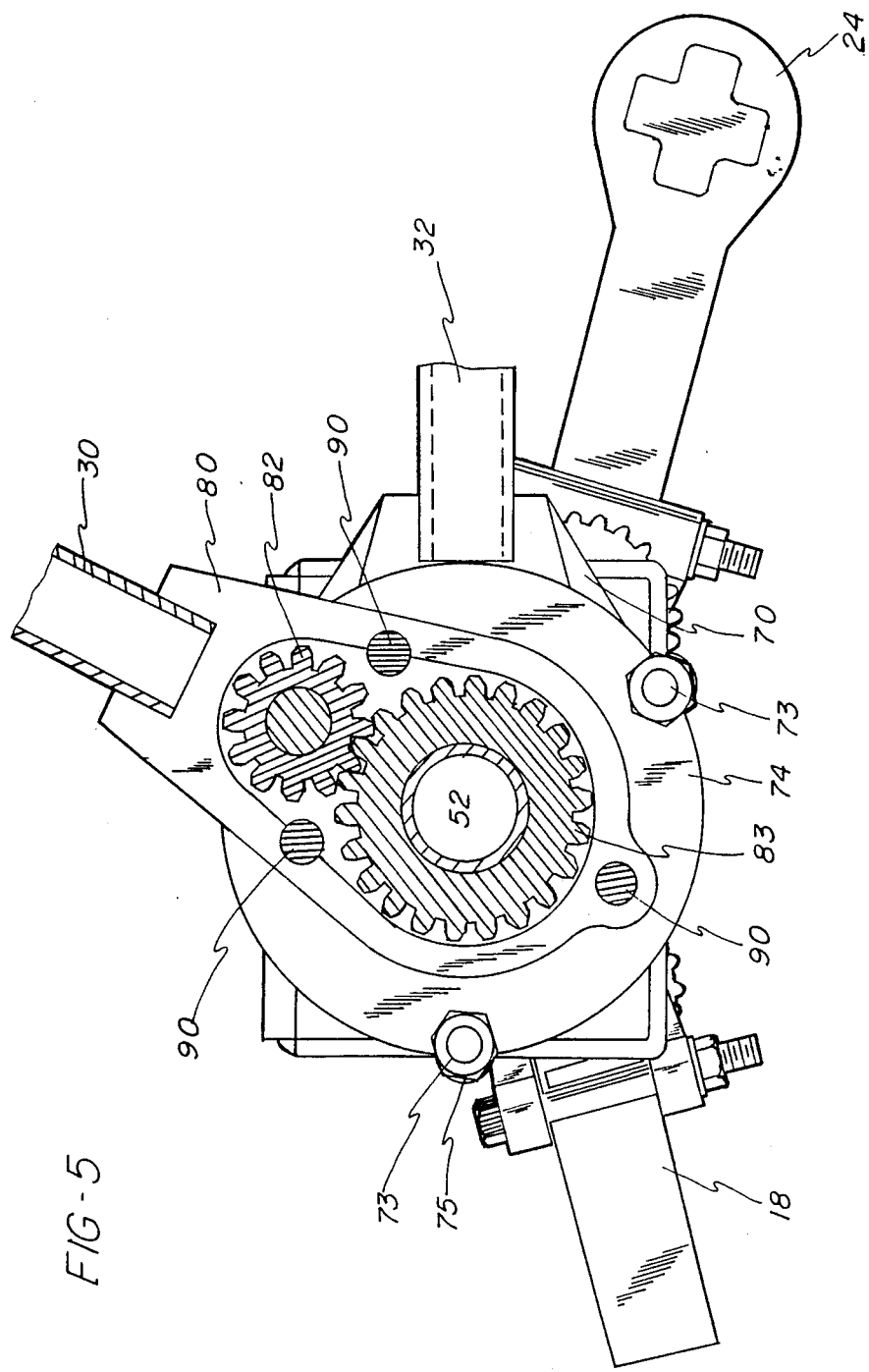
FIG. 5 is an end view, with the cover plate removed, of one of the gear-adjusting mechanisms of this invention.

A tension arm holder 80 supports the tension arm 30, as shown in FIGS. 4 and 5. The arm holder 80 is, in effect, a gear housing which rotatably contains a pair of constantly intermeshed gears for adjusting the relative position of the arm holder 80 with respect to the shaft 52.

A pinion gear 82 is in constant mesh with a bull gear 83. The gear 83 is fixedly mounted by welding on the end of the shaft 52. The pinion gear 82 has a bushing 84 received within a suitable opening 85 on the holder 80.

The gears are held in place in the holder 80 by a cover plate 86. A drive shaft 88 of the pinion gear 82 extends through the plate 86. The cover plate 86 is retained on the tension arm holder 80 by a series of stud bolts 90 and hex nuts 92.

In order to make an adjustment, the nuts 92 are loosened, permitting the pinion gear to be rotated by the shaft 88, thereby affecting relative rotation between the holder 80 and the inner shaft 52. The drive shaft 88 is accessible alongside of the belt, in the duplicate mechanism on either side of the belt scraper.

In the operation of the invention, the upstream and downstream scraper blades 14 and 16 respectively are biased into running engagement with an outer surface of the belt 12 by the air cylinder 35 acting through the tension arms 30 and 32. It is important, in view of the limited travel of the air cylinders 35, to provide for a positioning of the blades in relation to the belt surface, at initial installation of the scraper and following replacement of the blades. The angle of the blades with respect to the surface of the belt may be adjusted by suitable adjustment at the connecting knuckle parts 56, 57 and 56a, 57a, as previously described. Generally, once this setting has been established, no further adjustment is required. Similarly, the angle of the tension arm 32 or its relative position on the actuator shaft 50 may be adjusted, by selecting the position of the tension arm holder 80 with respect to the serrated disc 72, and then tightening the nuts 75 to maintain this position. Again, this is an adjustment which, once made, is generally not repeated for a given installation.

The scraper supporting arms, for maintenance and scraper blade replacement, may be swung apart conveniently by loosening the clamping action of the nuts 92 and simply rotating the pinion gear 82 by the shaft 88 from the positions alongside the belt. Similarly, an adjusted position may be readily and easily obtained by reversing this procedure, and therefore maintained by clamping the cover plate 86 against the meshed gears 82, 83. This adjustment is made at each of the adjusting mechanisms at each side of the belt scraper to achieve the desired contact and uniformity of pressure across the transverse length of the blades.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An improved belt scraper apparatus comprising
   a first pair of primary support arms,
   a first shaft oriented transversely to a conveyor belt,
   means mounting said first pair of arms on said first shaft,
   a first transversely oriented belt scraper mounted on said first pair of arms and adapted to be positioned in running engagement with the belt,
   a second shaft positioned in concentric relation to said first shaft,
   a second pair of primary support arms,
   means mounting said second pair of arms on said second shaft,
   a second transversely oriented belt scraper mounted on said second pair of arms adapted to be positioned in running engagement with the belt in spaced relation to the first scraper,
   a separate actuator arm for each of said shafts including a first actuator arm connected to rotate one of said shafts and a second actuator arm connected to rotate the other of said shafts,
   means for adjusting the relative angular position of one of said actuator arms with its associated said shaft comprising a gear housing,
   means mounting said one actuator arm on said housing,
   a main gear in said housing mounted on said associated shaft, and
   a pinion gear rotatably received in said housing in engagement with said main gear so that rotation of said main gear by said pinion gear changes the angular relationship between the one actuator arm and the associated said shaft.

2. In a belt scraper for removing debris from the outer surface of a conveyor belt including a first pair of blade supporting arms, a transversely oriented belt scraper blade mounted on said first pair of arms and adapted to be positioned in running engagement with an outer surface of the conveyor belt, a second pair of blade supporting arms and a second transversely oriented belt scraper blade mounted on said second pair of arms and adapted to be positioned in running engagement with the belt outer surface in spaced relation to said first scraper blade, separate shaft means rotatably mounting each of said pairs of arms for independent rotational movement to each other, and tension arms, at least one each common to each of said pair of blade supporting arms and connected to the associated shaft means for urging the associated scraper blade into engagement with the belt, the improvement in means for adjusting the relative angular position of one of said pair of blade supporting arms to its associated said tension arm, comprising:
   a gear housing,
   means mounting said gear housing on the associated said tension arm,
   said gear housing containing a first gear,
   means mounting said first gear to the associated said shaft means,
   a second gear in said housing in running engagement with said first gear,
   means connected to rotate said second gear for changing the relative angular position of the associated said blade support arms with respect to the associated said tension arm, and
   means on said gear housing for locking said gears in an adjusted position.

3. The belt scraper of claim 2 in which said means connected to rotate said second gear is accessible at one lateral side of said belt, whereby the associated said blade may be adjusted into a desired running engagement with said belt surface.

4. An improved belt scraper apparatus for removing debris from the outer surface of a conveyor belt, comprising:
   a first pair of blade supporting arms,
   means mounting said first pair of arms on a transverse shaft,
   a first transversely oriented belt scraper blade mounted on said first pair of arms and adapted to be positioned in running engagement with said belt,
   a second pair of scraper blade supporting arms,
   means mounting said second pair of arms on a second transverse shaft positioned in concentric relation to said first shaft,
   a second transversely oriented belt scraper blade mounted on said second pair of arms and adapted to be positioned in running engagement with said belt in spaced relation to said first blade,
   a pair of tension arms, one each for each of said shafts,
   an air cylinder connecting said tension arms for urging the associated said blade into running engagement with said belt,
   means for adjusting the relative angular position of one of said tension arms with respect to its associated said shaft, including a gear housing,
   means mounting said housing on the associated said arm,
   a first gear in said housing mounted on the associated said shaft,
   a second gear in said housing in running engagement with said first gear, and
   means for rotating said second gear to change the relative position of the associated said actuator arm with respect to the associated said shaft.

* * * * *